(12) United States Patent
Adam et al.

(10) Patent No.: US 9,825,945 B2
(45) Date of Patent: Nov. 21, 2017

(54) PRESERVING DATA PROTECTION WITH POLICY

(71) Applicant: Microsoft Technology Licensing, LLC, Redmond, WA (US)

(72) Inventors: Preston Derek Adam, Woodinville, WA (US); Narendra S. Acharya, Kirkland, WA (US); Innokentiy Basmov, Redmond, WA (US); Octavian T. Ureche, Bellevue, WA (US); Yogesh A. Mehta, Redmond, WA (US); Alex M. Semenko, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 14/481,672

(22) Filed: Sep. 9, 2014

(65) Prior Publication Data
US 2016/0072796 A1 Mar. 10, 2016

(51) Int. Cl.
*H04L 29/06* (2006.01)
*G06F 21/62* (2013.01)
*G06F 21/60* (2013.01)

(52) U.S. Cl.
CPC ........ *H04L 63/0853* (2013.01); *G06F 21/602* (2013.01); *G06F 21/6281* (2013.01); *H04L 63/20* (2013.01); *G06F 2221/2107* (2013.01)

(58) Field of Classification Search
CPC .............. G06F 21/602; G06F 21/6218; G06F 21/6281; G06F 2221/2107; H04L 63/0853; H04L 63/20

(Continued)

(56) References Cited

U.S. PATENT DOCUMENTS

| 5,495,533 A | 2/1996 | Linehan et al. |
| 5,787,131 A | 7/1998 | Bottomley |

(Continued)

FOREIGN PATENT DOCUMENTS

| CN | 1653422 | 8/2005 |
| CN | 1713756 | 12/2005 |

(Continued)

OTHER PUBLICATIONS

"Adobe AIR 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.

(Continued)

*Primary Examiner* — Yogesh Paliwal

(57) ABSTRACT

Data files are encrypted based on a key associated with an entity that sets a data protection policy controlling access to the data files. The data protection policy identifies various restrictions on how the plaintext data of the encrypted data in the data files can be used. The data files have corresponding metadata identifying the entity that sets the data protection policy, and processes that are running instances of applications that are allowed to access the plaintext data are also associated with the identifier of the entity. These identifiers of the entity, as well as the data protection policy, are used by an operating system of a computing device to protect the data in accordance with the data protection policy, including having the protection be transferred to other devices with the protected data, or preventing the protected data from being transferred to other devices.

20 Claims, 4 Drawing Sheets

(58) Field of Classification Search
USPC .......................................................... 713/159
See application file for complete search history.

(56) References Cited

U.S. PATENT DOCUMENTS

| | | | |
|---|---|---|---|
| 5,897,661 A | 4/1999 | Baranovsky et al. | |
| 5,944,783 A | 8/1999 | Nieten | |
| 5,966,263 A | 10/1999 | Freitas et al. | |
| 5,974,503 A | 10/1999 | Venkatesh et al. | |
| 6,016,402 A | 1/2000 | Thomas et al. | |
| 6,028,725 A | 2/2000 | Blumenau | |
| 6,041,386 A | 3/2000 | Bello | |
| 6,067,199 A | 5/2000 | Blumenau | |
| 6,076,143 A | 6/2000 | Blumenau | |
| 6,134,062 A | 10/2000 | Blumenau | |
| 6,151,665 A | 11/2000 | Blumenau | |
| 6,170,037 B1 | 1/2001 | Blumenau | |
| 6,170,055 B1 | 1/2001 | Meyer et al. | |
| 6,253,300 B1 | 6/2001 | Lawrence et al. | |
| 6,292,317 B1 | 9/2001 | Alexander | |
| 6,292,790 B1 | 9/2001 | Krahn et al. | |
| 6,550,011 B1 | 4/2003 | Sims, III | |
| 6,665,784 B2 | 12/2003 | Ihde et al. | |
| 6,727,896 B2 | 4/2004 | Tsang | |
| 6,728,379 B1 | 4/2004 | Ishibashi et al. | |
| 6,789,162 B1 | 9/2004 | Talagala et al. | |
| 6,944,742 B1 | 9/2005 | Shoff et al. | |
| 6,968,973 B2 | 11/2005 | Uyttendaele et al. | |
| 6,996,696 B2 | 2/2006 | Shoff et al. | |
| 7,197,638 B1 | 3/2007 | Grawrock et al. | |
| 7,356,662 B2 | 4/2008 | Shoff et al. | |
| 7,360,073 B1 | 4/2008 | Billstrom et al. | |
| 7,380,140 B1 | 5/2008 | Weissman et al. | |
| 7,382,883 B2 | 6/2008 | Cross et al. | |
| 7,409,623 B2 | 8/2008 | Baker et al. | |
| 7,451,484 B1 | 11/2008 | Nadalin et al. | |
| 7,536,536 B1 | 5/2009 | Joshi et al. | |
| 7,559,088 B2 | 7/2009 | Cohen et al. | |
| 7,580,950 B1 | 8/2009 | Kavuri et al. | |
| 7,594,087 B2 | 9/2009 | Zeevi et al. | |
| 7,646,380 B2 | 1/2010 | Tsang | |
| 7,694,134 B2 | 4/2010 | Witt et al. | |
| 7,711,923 B2 | 5/2010 | Rogers et al. | |
| 7,725,703 B2 | 5/2010 | Hunter et al. | |
| 7,757,100 B2 | 7/2010 | Weissman et al. | |
| 7,849,254 B2 | 12/2010 | Ash et al. | |
| 7,890,664 B1 | 2/2011 | Tao et al. | |
| 7,903,549 B2 | 3/2011 | Judge et al. | |
| 7,930,540 B2 | 4/2011 | Ahuja et al. | |
| 7,962,739 B2 | 6/2011 | Childs et al. | |
| 7,979,626 B2 | 7/2011 | Rogers | |
| 8,046,365 B2 | 10/2011 | Saito | |
| 8,046,533 B2 | 10/2011 | Kompella et al. | |
| 8,085,933 B2 | 12/2011 | Ferguson | |
| 8,214,656 B1 | 7/2012 | Plotkin et al. | |
| 8,234,477 B2 | 7/2012 | Shaath | |
| 8,249,257 B2 | 8/2012 | Brutch et al. | |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 | 2/2013 | Ureche et al. | |
| 8,411,863 B2 | 4/2013 | Ureche et al. | |
| 8,416,954 B1 | 4/2013 | Raizen et al. | |
| 8,417,973 B2 | 4/2013 | Cooper et al. | |
| 8,423,792 B2 | 4/2013 | Luciani et al. | |
| 8,458,490 B2 | 6/2013 | Konetski et al. | |
| 8,527,561 B1 | 9/2013 | Moody, II et al. | |
| 8,538,919 B1 | 9/2013 | Nielsen et al. | |
| 8,549,271 B1 | 10/2013 | Joshi et al. | |
| 8,583,879 B1 | 11/2013 | Na et al. | |
| 8,588,422 B2 | 11/2013 | Beachem et al. | |
| 8,625,802 B2 | 1/2014 | Parann-Nissany | |
| 8,661,193 B1 | 2/2014 | Cobos et al. | |
| 8,667,213 B2 | 3/2014 | Rogers et al. | |
| 8,689,279 B2 | 4/2014 | Basmov et al. | |
| 8,726,343 B1 | 5/2014 | Borzycki et al. | |
| 8,726,407 B2 | 5/2014 | Etchegoyen | |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 9,323,465 B2 | 4/2016 | Flynn et al. | |
| 9,369,289 B1 | 6/2016 | Harrison et al. | |
| 9,430,664 B2 | 8/2016 | Adam et al. | |
| 9,477,614 B2 | 10/2016 | Basmov et al. | |
| 9,537,656 B2 | 1/2017 | Debout et al. | |
| 9,740,639 B2 | 8/2017 | Basmov et al. | |
| 2001/0000265 A1* | 4/2001 | Schreiber | G06F 17/211 726/30 |
| 2002/0019935 A1 | 2/2002 | Andrew et al. | |
| 2003/0081784 A1 | 5/2003 | Kallahalla et al. | |
| 2003/0084298 A1 | 5/2003 | Messerges et al. | |
| 2003/0196114 A1 | 10/2003 | Brew et al. | |
| 2003/0221095 A1 | 11/2003 | Gaunt et al. | |
| 2004/0044912 A1 | 3/2004 | Connary et al. | |
| 2004/0090811 A1 | 5/2004 | Kang | |
| 2004/0146015 A1 | 7/2004 | Cross et al. | |
| 2004/0174345 A1 | 9/2004 | Tsang | |
| 2005/0071280 A1 | 3/2005 | Irwin et al. | |
| 2005/0091661 A1 | 4/2005 | Kurien et al. | |
| 2005/0097341 A1* | 5/2005 | Francis | G06F 21/10 713/189 |
| 2005/0213377 A1 | 9/2005 | Shoff et al. | |
| 2005/0262361 A1 | 11/2005 | Thibadeau | |
| 2005/0265074 A1 | 12/2005 | Shoff et al. | |
| 2005/0283730 A1 | 12/2005 | Uyttendaele et al. | |
| 2006/0101027 A1 | 5/2006 | Hotchkiss | |
| 2006/0155919 A1 | 7/2006 | Lasser et al. | |
| 2006/0190984 A1 | 8/2006 | Heard et al. | |
| 2006/0206507 A1 | 9/2006 | Dahbour | |
| 2006/0277590 A1 | 12/2006 | Limont et al. | |
| 2006/0279556 A1 | 12/2006 | Tsang | |
| 2007/0028231 A1 | 2/2007 | Kelso et al. | |
| 2007/0058806 A1 | 3/2007 | Ferguson | |
| 2007/0150886 A1 | 6/2007 | Shapiro | |
| 2007/0244940 A1 | 10/2007 | Devarakonda et al. | |
| 2007/0250678 A1 | 10/2007 | Ueoka et al. | |
| 2007/0300008 A1 | 12/2007 | Rogers et al. | |
| 2007/0300037 A1 | 12/2007 | Rogers et al. | |
| 2008/0002830 A1 | 1/2008 | Cherkasov et al. | |
| 2008/0005467 A1 | 1/2008 | Morley et al. | |
| 2008/0010468 A1 | 1/2008 | Ruiz | |
| 2008/0082448 A1* | 4/2008 | Meijer | G06F 21/10 705/14.69 |
| 2008/0083036 A1 | 4/2008 | Ozzie et al. | |
| 2008/0107262 A1 | 5/2008 | Helfman et al. | |
| 2008/0130156 A1 | 6/2008 | Chu et al. | |
| 2008/0141040 A1 | 6/2008 | Biddle et al. | |
| 2008/0155316 A1 | 6/2008 | Pawar et al. | |
| 2008/0168315 A1 | 7/2008 | Mead et al. | |
| 2008/0229428 A1 | 9/2008 | Camiel | |
| 2008/0240253 A1 | 10/2008 | Au et al. | |
| 2008/0240441 A1 | 10/2008 | Kawakami | |
| 2008/0263371 A1 | 10/2008 | Weissman et al. | |
| 2008/0301470 A1 | 12/2008 | Green et al. | |
| 2009/0024795 A1 | 1/2009 | Kobara | |
| 2009/0063756 A1 | 3/2009 | Asipov | |
| 2009/0075630 A1 | 3/2009 | McLean | |
| 2009/0132474 A1 | 5/2009 | Ma et al. | |
| 2009/0205012 A1 | 8/2009 | Jain et al. | |
| 2009/0210267 A1 | 8/2009 | Fish et al. | |
| 2009/0287874 A1 | 11/2009 | Rogers et al. | |
| 2009/0307563 A1 | 12/2009 | Marquez et al. | |
| 2010/0082898 A1 | 4/2010 | Mangold et al. | |
| 2010/0100721 A1 | 4/2010 | Su et al. | |
| 2010/0107213 A1 | 4/2010 | Ureche | |
| 2010/0169948 A1 | 7/2010 | Budko et al. | |
| 2010/0250847 A1 | 9/2010 | Chen | |
| 2010/0266132 A1 | 10/2010 | Bablani et al. | |
| 2010/0299152 A1 | 11/2010 | Batchu et al. | |
| 2010/0306175 A1 | 12/2010 | Johnson et al. | |
| 2010/0332725 A1 | 12/2010 | Post et al. | |
| 2011/0010560 A1 | 1/2011 | Etchegoyen | |
| 2011/0035577 A1 | 2/2011 | Lin et al. | |
| 2011/0055559 A1 | 3/2011 | Li et al. | |

(56) References Cited

U.S. PATENT DOCUMENTS

| | | |
|---|---|---|
| 2011/0055560 A1 | 3/2011 | Meissner et al. |
| 2011/0060915 A1 | 3/2011 | Tal |
| 2011/0078760 A1 | 3/2011 | De Perthuis |
| 2011/0087890 A1 | 4/2011 | Munsil et al. |
| 2011/0154023 A1 | 6/2011 | Smith et al. |
| 2011/0202916 A1 | 8/2011 | Voba et al. |
| 2011/0225431 A1 | 9/2011 | Stufflebeam, Jr. et al. |
| 2011/0225640 A1 | 9/2011 | Ganapathy et al. |
| 2011/0246785 A1 | 10/2011 | Linsley et al. |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1* | 11/2011 | Chinta ............... G06F 21/6218 726/1 |
| 2012/0017095 A1 | 1/2012 | Blenkhorn et al. |
| 2012/0036347 A1 | 2/2012 | Swanson et al. |
| 2012/0036370 A1 | 2/2012 | Lim et al. |
| 2012/0079603 A1 | 3/2012 | Brown et al. |
| 2012/0087033 A1 | 4/2012 | Yang |
| 2012/0110345 A1 | 5/2012 | Pigeon et al. |
| 2012/0159148 A1 | 6/2012 | Behren et al. |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov et al. |
| 2013/0054979 A1 | 2/2013 | Basmov et al. |
| 2013/0061035 A1 | 3/2013 | Hook et al. |
| 2013/0067242 A1 | 3/2013 | Lyakhovitskiy et al. |
| 2013/0074142 A1 | 3/2013 | Brennan et al. |
| 2013/0086691 A1 | 4/2013 | Fielder |
| 2013/0091543 A1 | 4/2013 | Wade et al. |
| 2013/0117561 A1* | 5/2013 | Chawla ............... H04L 29/06 713/158 |
| 2013/0117805 A1 | 5/2013 | Kent et al. |
| 2013/0124859 A1 | 5/2013 | Pestoni et al. |
| 2013/0138971 A1 | 5/2013 | Budko et al. |
| 2013/0198474 A1 | 8/2013 | Shaath |
| 2013/0208893 A1 | 8/2013 | Shablygin et al. |
| 2013/0283392 A1 | 10/2013 | Mirashrafi et al. |
| 2013/0291055 A1 | 10/2013 | Muppidi et al. |
| 2013/0318359 A1 | 11/2013 | Morris et al. |
| 2014/0007182 A1 | 1/2014 | Qureshi et al. |
| 2014/0007222 A1 | 1/2014 | Qureshi et al. |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1 | 1/2014 | Smith et al. |
| 2014/0041046 A1 | 2/2014 | Vantalon et al. |
| 2014/0059690 A1 | 2/2014 | Li et al. |
| 2014/0075493 A1 | 3/2014 | Krishnan et al. |
| 2014/0081980 A1 | 3/2014 | Aad |
| 2014/0109178 A1 | 4/2014 | Barton et al. |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1 | 8/2014 | Roth et al. |
| 2014/0259117 A1* | 9/2014 | Wachendorf ............ G06F 21/74 726/4 |
| 2014/0344570 A1 | 11/2014 | Adam et al. |
| 2014/0344571 A1 | 11/2014 | Adam et al. |
| 2014/0359793 A1 | 12/2014 | Dobson et al. |
| 2015/0033039 A1 | 1/2015 | Basmov et al. |
| 2015/0160879 A1 | 6/2015 | Flynn et al. |
| 2015/0186657 A1 | 7/2015 | Nakhjiri |
| 2015/0270956 A1 | 9/2015 | Basmov et al. |
| 2015/0278531 A1 | 10/2015 | Smith et al. |
| 2016/0080149 A1 | 3/2016 | Mehta et al. |
| 2016/0127327 A1 | 5/2016 | Mehta |
| 2016/0154744 A1 | 6/2016 | Zheng et al. |
| 2016/0173281 A1 | 6/2016 | White et al. |
| 2016/0255079 A1 | 9/2016 | Harrison et al. |
| 2016/0283406 A1 | 9/2016 | Linga et al. |
| 2017/0004094 A1 | 1/2017 | Basmov et al. |
| 2017/0005809 A1 | 1/2017 | Adam et al. |
| 2017/0104768 A1 | 4/2017 | Semenko et al. |

FOREIGN PATENT DOCUMENTS

| | | |
|---|---|---|
| CN | 102646077 | 8/2012 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2009149019 | 12/2009 |
| WO | WO-2012016091 | 2/2012 |
| WO | WO-2012167392 | 12/2012 |

OTHER PUBLICATIONS

"Final Office Action", U.S. Appl. No. 13/898,368, dated Apr. 16, 2015, 16 pages.

"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.

"InnoSetup Help", Retrieved From: <http://www.jrsoftware.org/ishelp/index.php?topic=filessection> May 12, 2015, 8 pages.

"What Android Sync'd Data is Encrypted?", Retrieved From: <http://android.stackexchange.com/questions/3129/what-android-syncd-data-is-encrypted>, Nov. 25, 2010, 3 pages.

Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.

Purdy,"Thumb Drive", Retrieved From: <http://lifehacker.com/5583307/top-10-usb-thumb-drive-tricks-2010-edition> May 12, 2015, Oct. 7, 2010, 6 pages.

Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.

"About EFS (Encrypting File System)", Available at: https://www.elcomsoft.com/help/en/aefsdr/about_efs.html, Oct. 28, 2014, 3 pages.

"Application Encryption—Vormetric Data Security Products", Available at: http://www.vormetric.com/products/vormetric-application-encryption, Jun. 27, 2014, 6 pages.

"Approaches for Encryption of Data at Rest in the Enterprise", In White Papers, 2008, 24 pages.

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.

"CheckVision Enterprise Encryption", Available at: http://assets1.csc.com/banking/downloads/CardsPayments_CheckVisionEnterprise_DS.pdf, Apr. 24, 2013, 2 pages.

"DataStax Enterprise 3.2", Available at: http://docs.datastax.com/en/datastax_enterprise/3.2/datastax_enterprise/sec/secTDE.html—Retrieved on: Jul. 23, 2015, 2 pages.

"Extended European Search Report", EP Application No. 11871440.1, dated Mar. 16, 2015, 5 pages.

"Extended European Search Report", EP Application No. 11871825.3, dated May 11, 2015, 7 pages.

(56) References Cited

OTHER PUBLICATIONS

"Final Office Action", U.S. Appl. No. 13/221,629, dated Dec. 23, 2013, 24 pages.
"Foreign Notice of Allowance", CN Application No. 201210314631.1, dated Aug. 20, 2015, 4 pages.
"Foreign Notice of Allowance", CN Application No. 201210314748.X, dated Jul. 3, 2015, 3 pages.
"Foreign Office Action", CN Application No. 201210314631.1, dated Dec. 1, 2014, 14 pages.
"Foreign Office Action", CN Application No. 201210314748.X, dated Mar. 17, 2015, 7 pages.
"Foreign Office Action", CN Application No. 201210314748.X, dated Sep. 23, 2014, 14 Pages.
"International Search Report and Written Opinion", Application No. PCT/US2015/021125, dated Jul. 3, 2015, 9 Pages.
"International Search Report and Written Opinion", Application No. PCT/US2011/055600, dated Jul. 30, 2012, 9 pages.
"International Search Report and Written Opinion", Application No. PCT/US2011/055626, dated Sep. 19, 2012, 9 pages.
"Non-Final Office Action", U.S. Appl. No. 13/221,629, dated May 17, 2013, 27 pages.
"Non-Final Office Action", U.S. Appl. No. 13/221,699, dated Apr. 1, 2013, 16 pages.
"Non-Final Office Action", U.S. Appl. No. 13/898,368, dated Aug. 4, 2015, 17 pages.
"Non-Final Office Action", U.S. Appl. No. 14/221,105, dated Aug. 4, 2015, 25 pages.
"Non-Final Office Action", U.S. Appl. No. 14/506,167, dated Jun. 29, 2015, 16 pages.
"Notice of Allowance", U.S. Appl. No. 13/221,629, dated Jun. 27, 2014, 16 pages.
"Notice of Allowance", U.S. Appl. No. 13/221,699, dated Oct. 30, 2013, 9 pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, dated Aug. 3, 2015, 1 pages.
"Security Solutions and Services", retrieved from <http://www.csc.com/public_sector/offerings/11043/17449-security_solutions_and_services> on Apr. 25, 2011, 2 pages.
"Transparent Data Encryption (TDE)", Available at: https://msdn.microsoft.com/en-in/library/bb934049.aspx—Retrieved on: Jul. 23, 2015, 11 pages.
"Unlock BitLocker under Windows PC", Retrieved from: <http://windows7migration.info/index.phpoption=com_content&view=article&id=1836:unlock-bitlocker-under-windows-pe&catid=42:4sysops&Itemid=61> on Aug. 4, 2011, 5 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.
Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.
Magnabosco,"Transparent Data Encryption", Available at: https://www.simple-talk.com/sql/database-administration/transparent-data-encryption/, Mar. 16, 2010, 19 pages.

Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.
Toegl,"acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 2011, 20 pages.
Wahl,"Oracle Advanced Security Transparent Data Encryption Best Practices", In Oracle White Paper, Jul. 2012, 29 pages.
"Final Office Action", U.S. Appl. No. 13/898,368, dated Dec. 2, 2015, 19 pages.
"Foreign Office Action", TW Application No. 100136564, dated Oct. 20, 2015, 11 pages.
"Non-Final Office Action", U.S. Appl. No. 13/933,928, dated Oct. 21, 2015, 11 pages.
"Non-Final Office Action", U.S. Appl. No. 14/489,288, dated Nov. 6, 2015, 25 pages.
"International Search Report and Written Opinion", Application No. PCT/US2015/049981, dated Dec. 3, 2015, 11 pages.
"International Preliminary Report on Patentability", Application No. PCT/US2013/061053, dated Nov. 24, 2015, 8 pages.
Menezes,"Handbook of Applied Cryptography", CRC Press LLC,, dated Jan. 1, 1997, pp. 25-27 & 551-553.
"Non-Final Office Action", U.S. Appl. No. 13/898,368, dated Dec. 8, 2014, 12 pages.
"Non-Final Office Action", U.S. Appl. No. 14/533,921, dated Apr. 19, 2016, 18 pages.
"Final Office Action", U.S. Appl. No. 14/489,288, dated Jun. 15, 2016, 25 pages.
"Foreign Notice of Allowance", TW Application No. 100136565, dated Mar. 25, 2016, 4 pages.
"International Preliminary Report on Patentability", Application No. PCT/US2015/021125, dated May 11, 2016, 7 pages.
"Notice of Allowance", U.S. Appl. No. 13/933,928, dated Apr. 22, 2016, 8 pages.
"Blackberry 10", Retrieved from <http://en.wikipedia.org/wiki/BlackBerry_10#BlackBerry_Balance> on Apr. 2, 2013, Apr. 1, 2013, 8 pages.
"Divide: The Next Generation of Enterprise Mobility", Retrieved at <<http://www.divide.com/download/Divide_Product_Sheet_1116.pdf<< on May 8, 2013, Jan. 20, 2013, 2 pages.
"Exchange ActiveSync", Retrieved from <http://en.wikipedia.org/wiki/Exchange_ActiveSync> on Apr. 1, 2013, Apr. 1, 2013, 5 pages.
"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"International Search Report and Written Opinion", Application No. PCT/US2013/061053, dated Jan. 30, 2014, 10 Pages.
"Mobile Device Management", Retrieved from <http://www.bing.com/search?q=mobile+device+management&src=IE-TopResult&FORM=IE10TR> on Apr. 2, 2013, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.
"Securing end-user mobile devices in the enterprise", In Proceedings: Thought Leadership White Paper, IBM Global Technology Services,Apr. 2011, 6 Pages.
"ThoriumCloud Enterprise Container", Retrieved from <http://www.thoriumcloud.com/> on Mar. 25, 2013, 2013, 4 Pages.

(56) References Cited

OTHER PUBLICATIONS

"Various Mobile Device Management (MDM) Solutions", Retrieved From: <http://www.bing.com/search?q=mobile+device+management&src=IE-TopResult&FORM=IE10TR> Mar. 5, 2014, 2 Pages.

"Windows Selective Wipe for Device Data Management", Retrieved from <http://technet.microsoft.com/en-us/library/dn486874.aspx>, Nov. 1, 2013, 4 pages.

Becher, et al., "Mobile Security Catching Up? Revealing the Nuts and Bolts of the Security of Mobile Devices", Proceedings of IEEE Symposium on Security and Privacy, May 22, 2011, pp. 96-111.

Bugiel, "Practical and Lightweight Domain Isolation on Android", Proceedings of the 1st ACM Workshop on Security and privacy in Smartphones and Mobile Devices, Oct. 17, 2011, 12 pages.

Gudeth, et al., "Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.

Mitchell, "What is a Selective Wipe?", Retrieved from <http://www.landesk.com/blog/what-is-a-selective-wipe/> on Mar. 25, 2013, Apr. 30, 2012, 1 page.

Oberheide, et al., "When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.

Pecherle, et al., "Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>,Sep. 2010, pp. 939-948.

Pisko, et al., "Trusted Computing in Mobile Platforms—Players, Usage Scenarios, and Interests", Proceedings of Privacy and Security, Sep. 2005, pp. 526-530.

Stehle, "Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.

Stockton, "Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.

Zeis, "The security of BlackBerry Balance", Retrieved From: <http://crackberry.com/security-blackberry-balance> Mar. 6, 2014, Aug. 2, 2013, 13 pages.

"Advisory Action", U.S. Appl. No. 14/506,167, dated Apr. 13, 2016, 3 pages.

"Final Office Action", U.S. Appl. No. 14/221,105, dated Feb. 22, 2016, 35 pages.

"Foreign Notice of Allowance", TW Application No. 100136564, dated Feb. 25, 2016, 4 pages.

"International Search Report and Written Opinion", Application No. PCT/US2015/058707, dated Jan. 20, 2016, 11 Pages.

"International Search Report and Written Opinion", Application No. PCT/US2015/048750, dated Apr. 11, 2016, 22 pages.

"Second Written Opinion", Application No. PCT/US2015/021125, dated Feb. 2, 2016, 6 pages.

Chen,"Hardware-Assisted Application-Level Access Control", ISC '09 Proceedings of the 12th International Conference on Information Security, Sep. 7, 2009, 16 pages.

"Corrected Notice of Allowance", U.S. Appl. No. 14/506,167, dated Sep. 7, 2016, 2 pages.

"Corrected Notice of Allowance", U.S. Appl. No. 14/506,167, dated Sep. 27, 2016, 2 pages.

"Examiner's Answer to Appeal Brief", U.S. Appl. No. 13/898,368, dated Sep. 8, 2016, 7 pages.

"Foreign Office Action", TW Application No. 105101128, dated Aug. 23, 2016, 5 pages.

"International Search Report and Written Opinion", Application No. PCT/US2016/039468, dated Sep. 1, 2016, 10 pages.

"Non-Final Office Action", U.S. Appl. No. 14/788,377, dated Sep. 23, 2016, 14 pages.

"Non-Final Office Action", U.S. Appl. No. 15/266,591, dated Oct. 12, 2016, 10 pages.

"Notice of Allowance", U.S. Appl. No. 14/506,167, dated Jun. 22, 2016, 11 pages.

"Second Written Opinion", Application No. PCT/US2015/048750, dated Aug. 8, 2016, 9 pages.

"Second Written Opinion", Application No. PCT/US2015/049981, dated Jul. 26, 2016, 5 pages.

"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.

"File locking—Wikipedia", Retrieved at: https://en.wikipedia.org/w/index.php?title=File_locking&oldid=679856482—on Dec. 15, 2016, 5 pages.

"International Preliminary Report on Patentability", Application No. PCT/US2015/048750, dated Dec. 6, 2016, 11 pages.

"International Preliminary Report on Patentability", Application No. PCT/US2015/049981, dated Oct. 18, 2016, 6 pages.

"International Preliminary Report on Patentability", Application No. PCT/US2015/058707, dated Oct. 27, 2016, 7 pages.

"International Search Report and Written Opinion", Application No. PCT/US2016/054036, dated Dec. 1, 2016, 12 pages.

"Second Written Opinion", Application No. PCT/US2016/039468, dated Dec. 1, 2016, 5 pages.

"Final Office Action", U.S. Appl. No. 14/533,921, dated Feb. 24, 2017, 15 pages.

"Foreign Notice of Allowance", TW Application No. 110501128, dated Dec. 29, 2016, 4 pages.

"Non-Final Office Action", U.S. Appl. No. 14/221,105, dated Feb. 24, 2017, 42 pages.

"Non-Final Office Action", U.S. Appl. No. 14/489,288, dated Jan. 19, 2017, 30 pages.

Kher,"Securing Distributed Storage: Challenges, Techniques, and Systems", ACM Workshop on Storage security and survivability, 2005, p. 9-25.

Sharma,"TransCrypt: Design of a Secure and Transparent Encrypting File System", Master's Thesis, Indian Institute of Technology Kanpur, Aug. 2006, 50 pages.

"Non-Final Office Action", U.S. Appl. No. 14/879,938, dated Mar. 24, 2017, 16 pages.

"Notice of Allowance", U.S. Appl. No. 15/266,591, dated May 11, 2017, 11 pages.

"Final Office Action", U.S. Appl. No. 14/506,167, dated Nov. 23, 2015, 19 pages.

"Final Office Action", U.S. Appl. No. 14/788,377, dated May 8, 2017, 20 pages.

"Corrected Notice of Allowance", U.S. Appl. No. 15/266,591, Jul. 5, 2017, 2 pages.

"Corrected Notice of Allowance", U.S. Appl. No. 15/266,591, Jul. 19, 2017, 2 pages.

"Final Office Action", U.S. Appl. No. 14/221,105, Aug. 23, 2017, 41 pages.

"Notice of Allowance", U.S. Appl. No. 14/489,288, Aug. 25, 2017, 8 pages.

"Second Written Opinion", U.S. Appl. No. PCT/US2016/054036, Aug. 8, 2017, 6 pages.

"Final Office Action", U.S. Appl. No. 14/879,938, dated Sep. 7, 2017, 16 pages.

"Notice of Allowance", U.S. Appl. No. 14/533,921, dated Oct. 5, 2017, 9 pages.

"Notice of Allowance", U.S. Appl. No. 14/788,377, Sep. 14, 2017, 15 pages.

"Supplemental Notice of Allowance", U.S. Appl. No. 14/489,288, Sep. 8, 2017, 2 pages.

\* cited by examiner

PRESERVING DATA PROTECTION WITH POLICY

BACKGROUND

As computing technology has advanced, computers have become increasingly commonplace in our lives. People oftentimes have multiple different computers, including laptops, tablets, smartphones, and so forth, and frequently share data across multiple computers. This has resulted in situations where it is desirable to keep some data, such as confidential work data, protected by encrypting the data. Although encrypting data has numerous benefits, it is not without its problems. One such problem is that oftentimes applications need to have access to the unencrypted data in order to operate on the data. Depending on the particular application accessing the data, allowing the application access to the unencrypted data can leave the unencrypted data vulnerable to being disclosed. This can be frustrating for users, as the data that they expect will be kept secret can be revealed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device an entity-trusted application on the computing device is identified, the entity-trusted application configured to access data. A first process that is a running instance of the entity-trusted application is associated with an identifier of an entity that sets a data protection policy controlling access to the data. An operating system of the computing device enforces the data protection policy of the entity, the enforcing including the automatically encrypting, by the operating system in accordance with the data protection policy, data saved by the first process, and further including preventing, by the operating system in accordance with the data protection policy, a second process that is a running instance of an entity-untrusted application from accessing the encrypted data.

In accordance with one or more aspects, a computing device includes a processing system comprising one or more processors, and one or more computer-readable storage media having stored thereon multiple instructions. The instructions, when executed by the processing system, cause the processing system to perform acts including identifying a first application on the computing device, the first application configured to access data that is encrypted, and associating a data file that includes the data with an identifier of an owner of the data, the owner of the data setting data protection policy controlling access to the data, and the identifier of the owner of the data potentially being separate from an identifier of a user that is logged into the computing device. The acts further include associating a first process that is a running instance of the first application with the identifier of the owner of the data, and enforcing, by an operating system of the computing device, the data protection policy of the owner. The enforcing includes allowing the data to be decrypted into plaintext data that is provided to the first process, and preventing the data from being decrypted into plaintext data and provided to a second process that is a running instance of a second application, the second process not being associated with the identifier of the owner of the data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
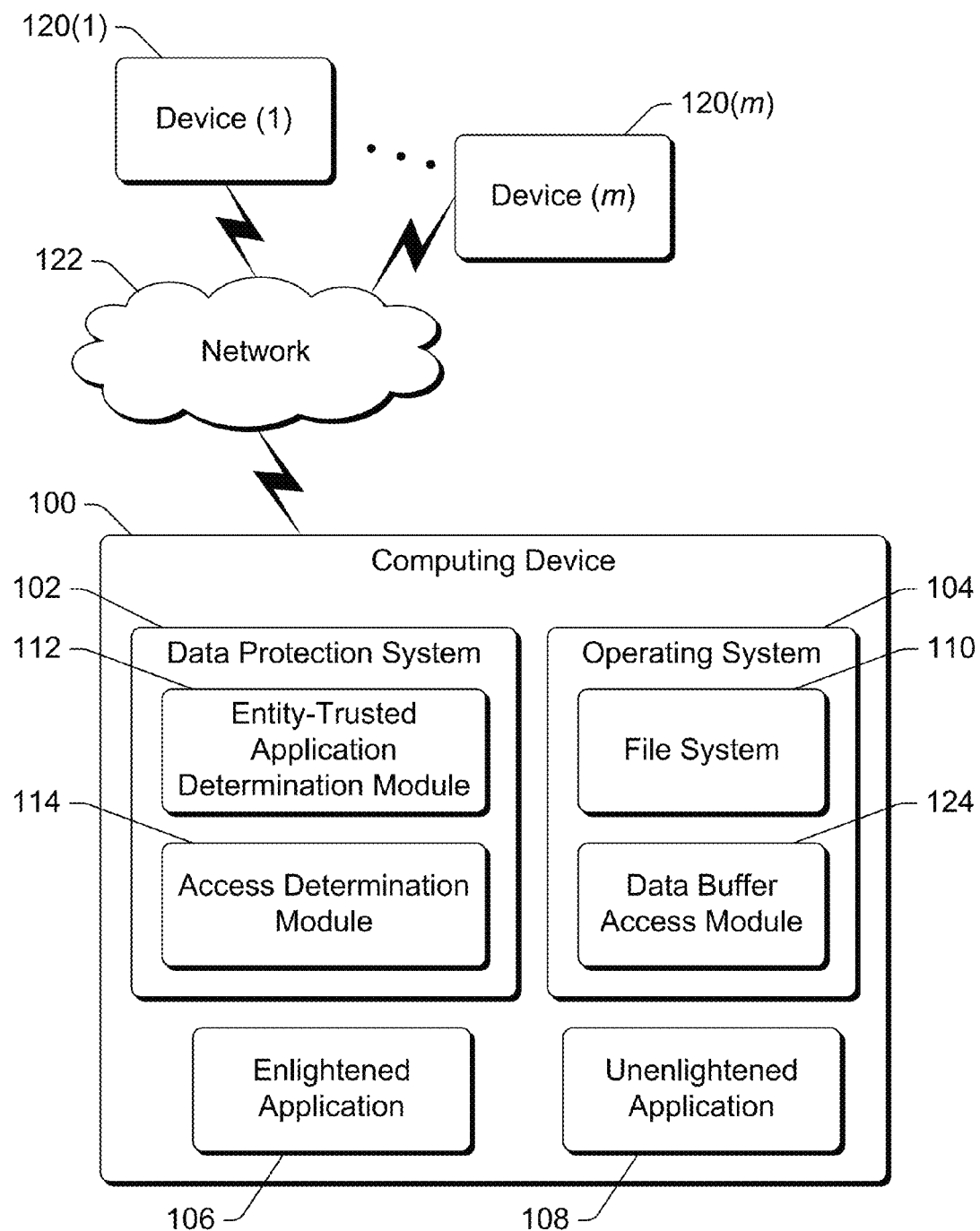
FIG. 1 is a block diagram illustrating an example computing device implementing the preserving data protection with policy in accordance with one or more embodiments.

Preserving data protection with policy is discussed herein. Data files are encrypted based on a key associated with an entity that sets a data protection policy controlling access to the data files, also referred to as the owner of the data. The data protection policy identifies various restrictions on how the data in the data files can be used, such as configurations or settings that a computing device is to have in order to access the plaintext data, how applications can use the plaintext data, and so forth. The data files have corresponding metadata identifying the owner of the data. Processes that are running instances of applications that are allowed to access the data are also associated with the identifier of the owner of the data. These identifiers of the owner of the data, as well as the data protection policy, are used by an operating system of a computing device to protect the data in accordance with the data protection policy. The operating system allows processes to access the data only if the processes are instances of applications that are trusted by the entity, the data protection policy is satisfied, and the entity identifier with which the process is associated is the same as the entity identifier with which the data file is associated.

The metadata corresponding to a data file travels with the data file, allowing the data file to be transferred to other devices and have the protection follow the data to the other devices. The operating system can also use a key associated with the entity to encrypt and decrypt data in data buffers, the clipboard, and so forth, allowing the operating system to continue to protect the data after it has been decrypted and provided to a process.

The preserving data protection with policy techniques discussed herein advantageously improves data security by allowing a data protection policy controlling access to data to travel with the data, regardless of where that data may be roamed. The data file advantageously remains securely encrypted, and metadata allowing applications with permission to access the data advantageously roams with the data file. The operating system of a computing device advantageously enhances security of the data by controlling encryption and decryption of the data on behalf of applications attempting to access the data, thereby providing protection of the data while alleviating the applications of needing changes to keep the data protected.

References are made herein to encryption, decryption, and keys. Encryption and decryption can be performed using symmetric key cryptography as well as public key cryptography with public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

FIG. 1 is a block diagram illustrating an example computing device 100 implementing the preserving data protection with policy in accordance with one or more embodiments. Computing device 100 can be a variety of different types of devices, such as a desktop computer, a server computer, a laptop or netbook computer, a tablet or phablet device, a notepad computer, a mobile station, an entertainment appliance, a set-top box communicatively coupled to a display device, a television or other display device, a cellular or other wireless phone, a game console, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a data protection system 102, an operating system 104, an enlightened application 106, and an unenlightened application 108. The operating system 104 manages the running of various different applications (including the enlightened application 106 and the unenlightened application 108), manages control to various components or other devices, and so forth. The data protection system 102 facilitates enforcing the data protection policy set by an entity, as discussed in more detail below. Although both the enlightened application 106 and the unenlightened application 108 are illustrated, in some situations the computing device 100 does not include the enlightened application 106 or the unenlightened application 108.

Various different entities can desire to set the data protection policy for data on the computing device 100. Such entities can include, for example, an organization (e.g., company, university or other school, government, etc.) that employs a user of the computing device 100 and that desires to keep various data regarding its operations confidential, a user of the computing device 100 that desires to keep various personal information confidential, and so forth. Different entities can set different data protection policies for different data on the computing device 100, so at any given time different data stored or accessed by the computing device 100 can be protected by different data protection policies.

Generally, a data protection policy identifies how data is to be protected. The data protection policy can include various settings or rules identifying various different ways in which the data is to be protected, such as restrictions on how the plaintext data (unencrypted data) in the data files can be used, which applications can access the plaintext data, how to identify which applications can use the plaintext data, dates or times when data can be accessed, configurations or settings that a computing device is to have in order to access the data, and so forth. These settings or rules in the data protection policy are specified by the entity and are whatever settings or rules the entity desires.

It should be noted that the data protection policy can change over time as desired by the entity that sets the data protection policy. These changes can make the data protection policy more restrictive (e.g., increase the protection of data) or less restrictive (e.g., decrease the protection of data) as desired by the entity. These changes, once made, are enforced by the data protection system 102 and/or operating system 104. Thus, data files generated prior to the changes to the data protection policy are, once the changes are made, protected using the changed data protection policy.

Data is protected for a particular entity by encrypting the data using one or more keys associated with the entity, and decrypting the data when appropriate using a key associated with the entity. The encryption and decryption can be done by invoking an encryption/decryption component of the computing device 100, which may be implemented by the data protection system 102 or the operating system 104. The key associated with a particular entity can be maintained locally at the computing device 100, or alternatively obtained from another device or service. Alternatively, the encryption and/or decryption can be performed by another device or service (e.g., a service trusted by the computing device 100 and accessed over a network).

The encrypted data can be stored as a data file that has corresponding metadata identifying the entity that sets the data protection policy for the data. This identifier can be used to identify the data protection policy, as discussed in more detail below. The metadata itself, the data protection policy, or a combination thereof indicates where or how to obtain one or more keys of the entity to decrypt and/or encrypt the data file, how to access the data in the data file (e.g., which data encryption and/or decryption algorithms or techniques to use), and so forth. The metadata thus describes how to, or identifies where a description is located of how to, decrypt the data in the data file. Although discussions herein refer to storing encrypted data as a data file, these discussions apply analogously to encrypted data that is buffers, blobs, or other collections of data. For example, a data file can contain multiple different collections of data, including different collections owned by different entities, some collections of unencrypted data, and so forth.

The metadata can correspond to or be associated with the encrypted data file in a variety of different manners. In one or more embodiments, the operating system 104 includes a file system 110 that supports encryption. For example, some of the operating systems in the Windows® family of operating systems incorporate an Encrypting File System (EFS) that supports encryption. Such operating systems can have an alternate data stream (e.g., an $EFS stream) that includes the metadata, and thus the operating system file system manages maintaining of the correspondence between an encrypted data file and its corresponding metadata.

Alternatively, a container (e.g., a file) that includes both the encrypted data and the metadata can be generated. The container can then be roamed (e.g., copied, moved, etc.) to various other devices with the protection of the data intact due to the container including both the encrypted data and the metadata. The operating system on a device to which the container is roamed need not support encryption, yet the data remains protected. In one or more embodiments, the container can be similar to (or exactly the same as) the container used for other data protection solutions (e.g., information rights management, which is focused on secure data sharing), thereby providing a seamless end-to-end coverage for secure data storage, secure data roaming and secure data sharing.

Applications are referred to herein as being entity-trusted or entity-untrusted, and also as being enlightened or unenlightened. An entity-trusted application refers to an application that is trusted by an entity that sets the data protection policy for data, such as an enterprise's information technology (IT) management department. An entity-untrusted application refers to an application that is not trusted by an entity that sets the data protection policy for data. An entity-trusted application may be permitted to access data protected by the data protection policy, whereas an entity-untrusted application is not permitted to access data protected by the data protection policy.

An enlightened application refers to an application that protects data in accordance with the data protection policy, invoking the functionality of the computing device 100 as appropriate to protect and handle protected according to the data protection policy. An unenlightened application refers to an application that does not (or need not) protect data in accordance with the data protection policy, and lets the operating system enforce the data protection policy. The operating system 104 can allow an enlightened application to access data protected by a data protection policy, automatically decrypting the data for the enlightened application and/or decrypting the data in response to a request from the enlightened application, and relying on the enlightened application to have data encrypted as appropriate. For an unenlightened application, however, the operating system 104 performs encryption and decryption to maintain the protection on the data in accordance with the data protection policy, because the operating system 104 knows the unenlightened application cannot be relied on to do so.

When an application is run or executed, a process that is a running instance of the application is launched or created. The operating system 104 maintains a process token describing various aspects of the process, and in one or more embodiments includes in the process token an identifier of the entity that sets the data protection policy for data accessed by the process. The entity that sets the data protection policy for the data is also referred to as the owner of the data, e.g., due to the entity dictating protection for the data. It should be noted that the owner of the data and a user logged into a computing device can be two different entities. The owner of the data dictates how the data is to be protected regardless of who is logged into a computing device, the login credentials for the computing device, and so forth. Thus, the process token may include an identifier of the user that is logged into a computing device, may include identifiers of groups that the user is part of, and in addition includes an identifier of the entity that sets the data protection policy for data accessed by the process. The identifier of the entity that sets the data protection policy is separate from any identifier of the user that is logged into the computing device.

Although the owner of the data and the user logged into the computing device can be two different entities, situations can arise where the owner of the data and the user logged into the computing device are the same entity. In such situations, the process token may include a single identifier that identifies both the user logged into the computing device and the owner of the data, or the process token can include an identifier of the user logged into the computing device (or otherwise associate the user logged into the computing device with the process), and a separate identifier of the owner of the data (or otherwise associate the owner of the data with the process).

Figure 2:
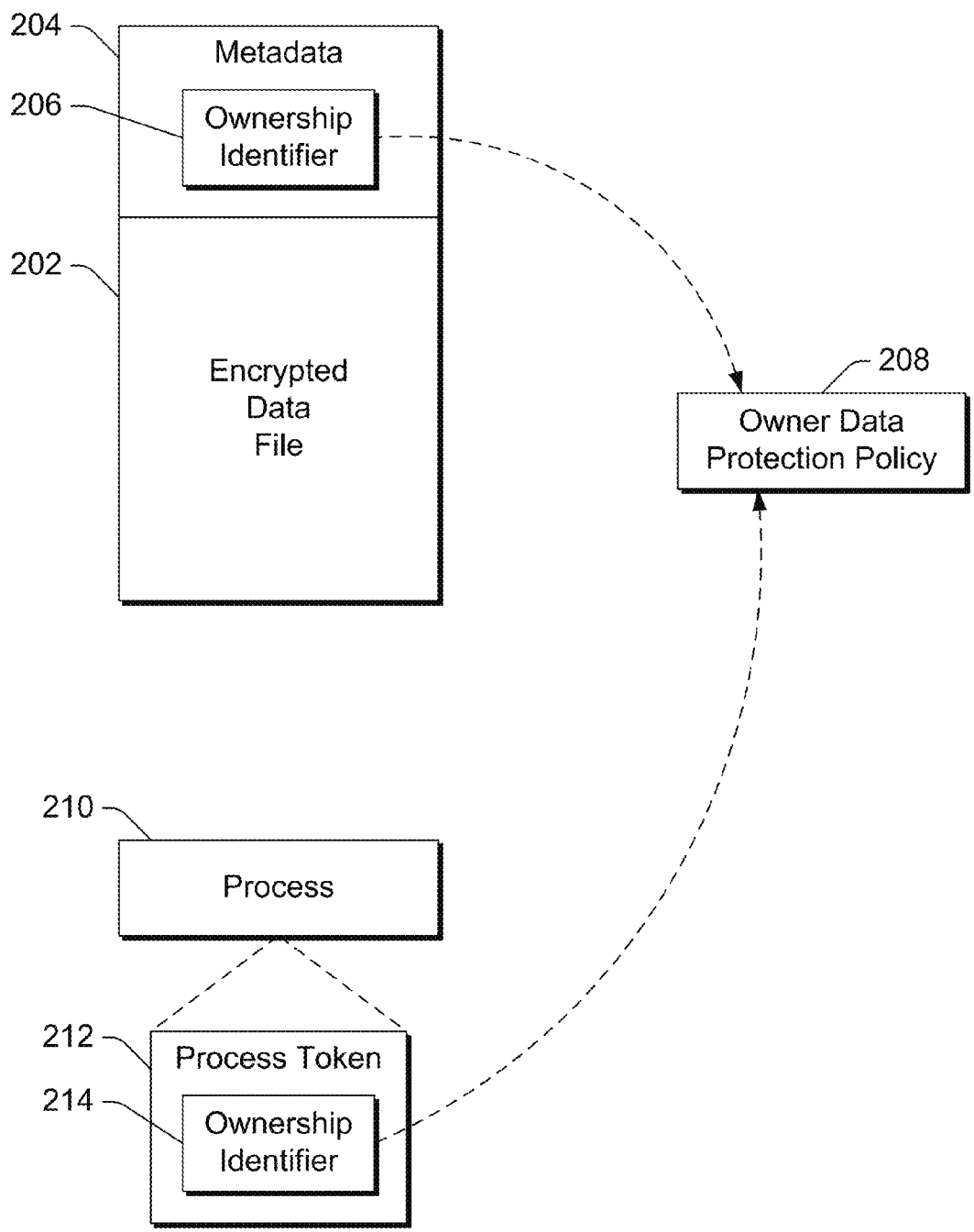
FIG. 2 illustrates an example of associating a data protection policy with data in accordance with one or more embodiments.

FIG. 2 illustrates an example 200 of associating a data protection policy with data in accordance with one or more embodiments. An encrypted data file 202 has corresponding metadata 204. The metadata 204 (which may not be encrypted) includes an ownership identifier 206 that identifies an owner of the encrypted data file 202. The ownership identifier 206 directly or indirectly identifies the data protection policy 208 of the owner of the encrypted data file 202, which is the entity that sets the data protection policy for the encrypted data file 202. The identifier can be a name or other string of characters allowing different owners to be distinguished from one another.

In the example of 200, a process 210 has an associated process token 212. The process token 212 includes an ownership identifier 214 that identifies an owner of data accessed by the process 210. The ownership identifier 214 directly or indirectly identifies the data protection policy 208 of the owner of the data accessed by the process 210. When the process 210 creates a new data file, the new data file is encrypted and includes metadata with an ownership identifier that identifies the data protection policy 208 (analogous to the metadata 204 and ownership identifier 206). This can be performed by a process launched from an enlightened application, or by an operating system on behalf of the process as discussed in more detail below.

The metadata corresponding to a data file is discussed herein as including an identifier that can be used to identify the data protection policy. Alternatively, at least part of the data protection policy can be included in the metadata, optionally with integrity controls on the data protection policy. The data protection policy is used as discussed herein regardless of how the data protection policy is identified or obtained (e.g., regardless of whether the data protection policy is included in the metadata or an identifier of the data protection policy is included in the metadata).

Different data can be owned by different entities. Which of multiple different entities (such as enterprise IT departments) is to be identified in the ownership identifier 214 can be determined in different manners. In one or more embodiments, if a process is launched by selection of a data file to be opened, then the ownership identifier 214 is set to be the same as the ownership identifier of the selected data file. For example, if the encrypted data file 202 were to be selected to be opened, then the ownership identifier 214 would be set to be the same as the ownership identifier 206. A data file can be selected to be opened by, for example, a user double-clicking on a name or icon representing the data file in a graphical user interface, the user hitting the "enter" key while a name or icon in a user interface is highlighted, a user selecting an "open with" or "run with" option on a menu displayed as associated with the data file, and so forth.

Alternatively, the ownership identifier 214 can be set in other manners. For example, the computing device 100 can have a default owner (e.g., configured in the data protection system 102 or the operating system 104), and the ownership identifier 214 is set to be the identifier of the default owner. The default owner can be, for example, an organization that a user of the computing device 100 works for (e.g., an identifier of a company or an enterprise). By way of another example, the user of the computing device 100 can be prompted to indicate the owner for the process. E.g., a prompt can be displayed to the user identifying the possible different owners, and user input selecting one of the displayed owners is received. The ownership identifier 214 is then set to be the identifier of the selected owner.

By way of yet another example, the process being launched may be attempting to open a location on another device and may provide credentials in order to open that location. In this situation, the ownership identifier 214 can be an indication of at least part of the credentials (e.g., a domain name or organization identifier included in the credential), or alternatively the credentials can be used to lookup (e.g., via another service or mapping) an owner that is associated with the credentials.

In one or more embodiments, the encrypted data file 202 and the metadata 204 together form a container which itself is a file. The container file may be a different file type (e.g., have a different extension) than the encrypted data file 202. The container file name can have a beginning portion that is the same as the encrypted data file 202, and thus is readily identifiable by users as being related to the encrypted data file. For example, the encrypted data file 202 name may be "foo.txt" and the container data file name may be "foo.txt-.pfile". Alternatively, the container file name may be based on the encrypted data file 202 name, but be modified or derived from the encrypted data file 202 name using various algorithms or techniques so that the container data file name is not readily identifiable by users as being related to the encrypted data file. For example, the encrypted data file 202 name may be "foo.txt" and the container data file name may be "grs39.pfile". Alternatively, the container file name may be the same as the encrypted data file 202 name, and the file system is able to tell the difference between the two.

Although a single process 210 is illustrated in FIG. 2, it should be noted that multiple processes can be running on a computing device at any given time, and the ownership identifier included in the process token of each process can be the same or different. Additionally, processes can inherit ownership identifiers from other processes. For example, if one process creates one or more child processes, each of those additional child processes can have the same ownership identifier in its process token as the process from which it was created.

FIG. 2 illustrates an example in which the metadata includes an ownership identifier and the process token includes an ownership identifier. It should be noted that these are examples of associating the ownership identifier with the encrypted data file and the process, and that other mechanisms can be used to associate the ownership identifier with the encrypted data file or the process. Any other records, lists, or other techniques for associating the ownership identifier with the encrypted data file can be used, as long as the operating system keeps track of the association and the association can travel with the encrypted data file if roamed to other devices. Any other records, lists, or other techniques for associating the ownership identifier with the process can also be used, as long as the operating system keeps track of the association between a process and whether the application from which the process was launched is trusted by the entity.

Returning to FIG. 1, a process having an ownership identifier that identifies a particular entity does not in and of itself allow the process to access data protected by the data protection policy of the entity. Rather, additional criteria are also to be satisfied in order to access data protected by the data protection policy of the entity. Specifically, the application from which the process was launched is to be an entity-trusted application, and the data protection policy is to indicate that access to the data is permitted, as discussed in more detail below.

The data protection system 102 includes an entity-trusted application determination module 112 and an access determination module 114. The entity-trusted application determination module 112 determines whether an application is trusted to access data protected by an entity (the entity identified by the ownership identifier in the process token of the process that is the running instance of the application). If the application is trusted to access data protected by the entity, then the process launched from the application may be able to access the data protected by the entity subject to the determination of the access determination module 114. However, if the application is not trusted to access data protected by the entity, then the process launched from the application is not able to access the data protected by the entity.

Whether an application is trusted to access data protected by the entity can be determined in various manners. In one or more embodiments, the entity-trusted application determination module 112 maintains or has access to a list of applications that are trusted by the entity. In such embodiments, the entity-trusted application determination module 112 determines the application is trusted if the application is on the list, and otherwise determines the application is not trusted.

Alternatively, the entity-trusted application determination module 112 can determine whether an application is trusted in other manners. For example, various rules, properties, criteria, algorithms, and so forth can be applied to determine whether an application is trusted. Such rules, criteria, algorithms, and so forth can be provided by the entity that sets the data protection policy, or alternatively by another entity, component, or module.

Additionally, situations can arise in which an application itself indicates that it desires not to be trusted. In such situations, the process launched from the application is not trusted and is not permitted to access data protected by the data protection policy. Such indications can be made by the application in response to various events, such as a user input. For example, a user may desire to run a word processing application that he or she uses for work, but use it to edit personal documents. The user can request that the application run in an entity-untrusted mode, so the user would not have access to encrypted work data while running the application in entity-untrusted mode, and data saved by the application while running in the entity-untrusted mode would not be encrypted or otherwise protected based on the data protection policy.

It should be noted that two different processes launched from the same application can be running concurrently, one in an entity-trusted mode and another in an entity-untrusted mode. For example, if a user requests that a personal file be opened when a process is running in an entity-trusted mode, a new process can be launched that is running in an entity-untrusted mode. This prevents, for example, the possibility of turning a non-protected file (e.g., a personal file) into a protected file (e.g., a work file). The reverse situation can also exist. For example, rather than giving an access denied message to an entity-trusted application running in an entity-untrusted mode, a new process can be launched in an entity-trusted mode so that the protected data can be opened and used without interrupting the user flow and while preserving the data protection policy.

If the application is trusted, then the process launched from the application is trusted and the access determination module 114 determines whether the application is permitted to access the data based on the data protection policy of the entity. The data protection policy identifies various settings or rules identifying various different ways in which the data is to be protected. The access determination module 114 enforces the data protection policy, verifying that the various settings or rules are satisfied. If the settings or rules in the data protection policy are satisfied, then the access determination module 114 allows the application to access the data by allowing the data to be decrypted (e.g., by obtaining the key to decrypt the data). However, if the settings or rules in the data protection policy are not satisfied, then the access determination module 114 does not allow the application to access the data.

In one or more embodiments, the data protection policy is enforced conditionally, such as only when the application is accessing and/or displaying protected data. Additionally, in one or more embodiments processes are trusted conditionally, such as when the process claims to be or can be tested to be running in an entity-trusted mode. This allows the situation where a process is not trusted for certain operations (e.g., paste of protected data) at a certain time, even if the data came from the same application earlier. For example, assume that some protected data is copied from one document, and that a document that is non-protected data is opened in the same process, and then the process switches to an entity-untrusted mode. If the user attempts to paste the protected data, the paste will fail because the process is attempting to put protected data into a document that is non-protected data.

The computing device 100 can include one or more enlightened applications 106, and one or more unenlightened applications 108. Whether an application is an enlightened application or an unenlightened application can be determined in various manners. For example, analogous to the manner in which the determination is made as to whether an application is trusted, various lists, rules, properties, criteria, algorithms, and so forth can be used to determine whether an application is an enlightened application or an unenlightened application. By way of another example, an indication of enlightened applications can be included in the data protection policy, thus allowing different owners to specify different applications that are enlightened.

The operating system 104 allows the enlightened application 106 to access data protected by a data protection policy, automatically decrypting the data for the enlightened application and/or decrypting the data in response to a request from the enlightened application, and relying on the enlightened application 106 to protect that data in accordance with the data protection policy. The enlightened application 106 can communicate with the data protection system 102 to have the data protection system 102 encrypt or decrypt data (or alternatively can obtain a key to encrypt data). The access determination module 114, knowing the requesting application is an enlightened application, allows the data to be decrypted. The access determination module 114, knowing the requesting application is an enlightened application, may also decide whether to allow the application to encrypt to the owner's key, based on the owner policy.

The enlightened application 106 can optionally switch between operating in an enlightened mode and an unenlightened mode. This switch is performed, for example, by the process that is a running instance of the enlightened application 106 requesting that the operating system 104 treat the enlightened application 106 as an unenlightened application. In the enlightened mode, the operating system 104 allows the process that is a running instance of the enlightened application 106 to protect the data in accordance with the data protection policy. In the unenlightened mode, the operating system 104 performs encryption and decryption, and otherwise operates to maintain the protection on the data in accordance with the data protection policy. The operating system performs these various operations on behalf of the process that is a running instance of the enlightened application 106 as if the enlightened application 106 were an unenlightened application as discussed in more detail below.

This difference in treatment for enlightened mode and unenlightened mode can optionally be enforced at the granularity of a thread within a process. A process can run as multiple threads, and each thread can operate in either enlightened mode or unenlightened mode.

Similarly, the enlightened application 106 can optionally switch between operating in an entity-trusted mode and an entity-untrusted mode for one or more data protection policies. This switch is performed, for example, by the process that is a running instance of the enlightened application 106 requesting that the operating system 104 treat the enlightened application 106 as either entity-trusted or entity-untrusted. In the entity-trusted mode, the enlightened application 106 is treated as an application that is trusted by the entity that sets the data protection policy for data. In the entity-untrusted mode, the enlightened application 106 is treated as an untrusted application that is not trusted by an entity that sets the data protection policy for data. This allows, for example, the process to make its own decisions regarding some operations (e.g., data encryption decisions) but not other operations (e.g., pasting of protected data).

This difference in treatment for entity-trusted mode and entity-untrusted mode can optionally be enforced at the granularity of a thread within a process. A process can run as multiple threads, and each thread can operate in either entity-trusted mode or entity-untrusted mode.

Having different treatment for threads in entity-trusted mode and entity-untrusted mode, as well as enlightened mode and unenlightened mode supports various usage scenarios. For example, a process that is running instance of an entity-trusted application can have the process (or one or more threads of the process) downgraded from entity-trusted mode to entity-untrusted mode to obtain more stringent enforcement behavior for the downgraded process or thread. By way of another example, a process that is running instance of an unenlightened application can have the process (or one or more threads of the process) downgraded from enlightened mode to unenlightened mode to obtain more stringent enforcement behavior for the downgraded process or thread (e.g., to get automatic encryption by the operating system).

The computing device 100 can also include one or more unenlightened applications 108. For the unenlightened application 108, the operating system 104 performs encryption and decryption, and otherwise operates to maintain the protection on the data in accordance with the data protection policy, as the operating system 104 knows the unenlightened application 108 cannot be relied on to do so. The operating system 104 can communicate with the data protection system 102 to obtain a key to encrypt or decrypt data, or have the data protection system 102 encrypt or decrypt data.

The operating system 104 performs various different actions to protect data in accordance with the data protection policy. This protection can include protecting the data during file accesses (file reads and writes), protecting the data when communicated over a network, protecting the data during data buffer accesses, protecting the data during clipboard accesses, protecting the data during other data sharing accesses (e.g., screen captures, data printing), combinations thereof, and so forth.

Protecting the data during file accesses includes the operating system 104 protecting the data during read file operations and write file operations. In response to a write file operation being requested by a process that is a running instance of the unenlightened application 108, the operating system 104 identifies the owner of the data being written as the entity identified by the ownership identifier associated with the running process. The operating system 104 obtains the data protection policy of the owner of the data, and verifies any other conditions in the data protection policy are satisfied. If the data protection policy is satisfied, then the operating system 104 encrypts the data (or has the data encrypted by the data protection system 102) based on an encryption key of the owner of the data and stores the data file in the location requested by the process.

In response to a read file operation being requested by a process that is a running instance of the unenlightened application 108, the operating system 104 identifies the owner of the data being read as the entity identified by the ownership identifier associated with the data file (e.g., from metadata corresponding to the data file). The operating system 104 also obtains the ownership identifier associated with the running process, and compares the ownership identifiers associated with the data file and the process. If the two ownership identifiers indicate different owners (e.g., the two ownership identifiers are different), then the operating system 104 does not decrypt the data. If the two ownership identifiers indicate the same owners (e.g., the two ownership identifiers are the same), then the operating system 104 obtains the data protection policy of the owner of the data, and verifies any other conditions in the data protection policy are satisfied. If the data protection policy is satisfied, then the operating system 104 decrypts the data (or has the data decrypted by the data protection system 102) based on a decryption key of the owner of the data, and returns the plaintext data to the unenlightened application 108.

Protecting the data when communicated over a network includes the operating system 104 protecting the data when communicating the data to another device. Data can be communicated over a network to other devices for file storage, for other data output (e.g., printing), and so forth. For example, the enlightened application 106 or the unenlightened application 108 can attempt to read files from, write files to, or otherwise transfer data to or from one or more other devices 120(1), . . . , 120(m) via a network 122. Each device 120 can be any of a variety of different types of computing devices (e.g., as discussed above with reference to the computing device 100), a dedicated storage device (e.g., a network hard drive), a dedicated input or output device (e.g., scanner, printer), and so forth. The network 122 can be a variety of different networks, including the Internet, a local area network (LAN), a public telephone network, an intranet, other public and/or proprietary networks, combinations thereof, and so forth.

The operating system 104 can restrict which other devices 120 data can be transferred to or from based on the data protection policy. The data protection policy can specify network addresses of one or more devices 120 to which or from which data can be transferred. Network addresses can be specified in different manners, such as a list of network addresses to or from which data can be transferred, a list of network addresses to or from which data cannot be transferred, rules or criteria to apply to determine which network addresses can be transferred to or from (e.g., whether certain credentials are needed to access the endpoint identified by a network address), and so forth.

A request to transfer data is received by the operating system 104 from a processes that is a running instance of the unenlightened application 108. The request is a request to transfer data to or from a target device (e.g., a device 120) specified by a network address of the target device. In response to the request to transfer data, the operating system 104 identifies the owner of the data being transferred as the entity identified by the ownership identifier associated with the running process. The operating system 104 obtains the data protection policy of the owner of the data, and verifies any other conditions in the data protection policy are satisfied. If the data protection policy is satisfied, including the target device having a network address to or from which data can be transferred, then the operating system 104 transfers the data to the target device. It should be noted that this transferring can be performed without encrypting or decrypting the data. For example, plaintext data can be transferred to a printer target device for printing of a hard copy of the plaintext data, to a display target device for displaying the plaintext data, from a network scanner, and so forth.

In one or more embodiments, the operating system 104 leverages a virtual private network (VPN) for the owner of data. For example, the user of the computing device 100 can use the device 100 for work, and the organization that the user works for can implement a company VPN that allows the computing device 100 to communicate with the other devices 120 on the company network. The VPN can include various firewall rules that designate which network addresses are included in the company network, and thus which network addresses data can be transferred to or from. Attempts to transfer data to or from addresses not permitted by the VPN result in the VPN blocking the communication. Accordingly, plaintext data can be communicated only to other devices 120 on the company network.

Alternatively, data can be encrypted prior to being transferred. For example, instead of blocking access to particular (e.g., non-company network) network addresses, the operating system 104 could allow the transfer of data, but have the data get encapsulated in a container file that can be roamed when it is transferred to such network addresses.

Protecting the data during data buffer accesses includes the operating system 104 protecting the data during buffer read operations and buffer write operations. In response to a write buffer operation being requested by a process that is a running instance of the unenlightened application 108, the operating system 104 (e.g., a data buffer access module 124 of the operating system 104) identifies the owner of the data being written as the entity identified by the ownership identifier associated with the running process. The operating system 104 obtains the data protection policy of the owner of the data, and verifies any other conditions in the data protection policy are satisfied. If the data protection policy is satisfied, then the operating system 104 encrypts the data (or has the data encrypted by the data protection system 102) based on an encryption key of the owner of the data and stores the data in the data buffer requested by the process.

In response to a read buffer operation being requested by a process that is a running instance of the unenlightened application 108, the operating system 104 (e.g., the data buffer access module 124) identifies the owner of the data being read as the entity identified by the ownership identifier associated with the running process. The operating system 104 obtains the data protection policy of the owner of the data, and verifies any other conditions in the data protection policy are satisfied. If the data protection policy is satisfied, then, if necessary the operating system 104 decrypts the data from the data buffer (or has the data from the data buffer decrypted by the data protection system 102) based on a decryption key of the owner of the data, and returns the plaintext data to the unenlightened application 108.

Protecting the data during clipboard accesses includes the operating system 104 protecting the data during clipboard read operations and clipboard write operations. In response to a write clipboard operation being requested by a process that is a running instance of an application (the enlightened application 108 or the unenlightened application 108), the operating system 104 identifies the owner of the data being written as the entity identified by the ownership identifier associated with the running process. The operating system 104 obtains the data protection policy of the owner of the data, and verifies any other conditions in the data protection policy are satisfied. If the data protection policy is satisfied, then the operating system 104 encrypts the data (or has the data encrypted by the data protection system 102) based on an encryption key of the owner of the data and stores the data on the clipboard. Alternatively, rather than encrypting the data, the operating system can associate the clipboard data with the ownership identifier associated with the running process (also referred to as marking or tagging the clipboard data with the identifier), and protect the data by using operating system access controls to prevent the clipboard data from being provided to entity-untrusted applications. However, if the data protection policy is not satisfied, then the operating system 104 does not encrypt the data or otherwise have the data associated with any ownership identifier.

In response to a read clipboard operation being requested by a process that is a running instance of an application (the enlightened application 106 or the unenlightened application 108), the operating system 104 identifies the owner of the data being read as the entity identified by the ownership identifier associated with the running process. The operating system 104 obtains the data protection policy of the owner of the data, and verifies any other conditions in the data protection policy are satisfied. If the data protection policy is satisfied, then the operating system 104 decrypts the data from the clipboard (or has the data from the clipboard decrypted by the data protection system 102) based on a decryption key of the owner of the data, and returns the plaintext data to the application.

The operating system 104 can similarly protect data transferred to (e.g., written to) other locations and transferred from (e.g., read from) other locations analogously to the protection of data during data buffer accesses or the protection of data when communicated over a network. For example, the owner of data written to a screen capture data buffer can be the entity identified by the ownership identifier associated with a process generating the user interface for the current window or the active application at the time the screen capture request is received, and the data can be encrypted and decrypted based on a key of the owner if the data protection policy is satisfied. By way of another example, the owner of data to be printed to a local printer of the computing device 100 can be the entity identified by the ownership identifier associated with the process submitting the print request, and the data can be printed if the data protection policy is satisfied, including the local printer being identified as a device (e.g., by address, name, or other identifier) to which data can be transferred.

The data protection policy is discussed above. It should be noted that one of the rules or criteria included in the data protection policy can be user input. Access to some data may be permitted if the user provides the correct user input, and not permitted if the user does not provide the correct user input. For example, various user credentials can be provided as the user input, such as a password, personal identification number (PIN), and so forth.

It should also be noted that one of the rules or criteria included in the data protection policy can be the physical location (e.g., geolocation) of the computing device 100. Access to some data may be permitted if the computing device 100 is in a particular one or more locations (e.g., in one or more particular geographic areas or geo-fences), but denied if the computing device 100 is not at the particular one or more locations (e.g., is outside of the one or more geographic areas or geo-fences).

It should also be noted that one of the rules or criteria included in the data protection policy can be types of files for which data is to be protected. These types of files can be specified in different manners, such as using file name extensions, data included in the metadata of the files, indications of where the file was found (e.g., on a local device, on a remote device, received via email), indications of where the file originated (e.g., which device or with which owner), indications of where the file is stored (e.g., on a local device, on a remote device), and so forth. For example, data stored in certain types of files (e.g., drawing files or spreadsheet files) may be protected while data stored in other types of files (e.g., text files or word processing files) may not be protected. This protection is applied regardless of which application creates the file. Thus, the operating system can advantageously conserve processing power, battery power, and so forth by not encrypting, decrypting, and otherwise protecting some types of data (e.g., data that is not considered to be confidential or secret by the owner).

Similarly, it should be noted that the permission of applications to access files (e.g., as enforced by the access determination module 114 as discussed above) can be the same for all files, or alternatively can be different for different types of files. For example, a particular application may be permitted to access some types of files (e.g., text files or word processing files) but not access other types of files (e.g., drawing files or spreadsheet files). Thus, the data protection system advantageously improves usability and security of the computing device by allowing use of applications for certain types of data, but not other types of data. For example, a synchronization engine may be permitted to access text files or word processing files, but not permitted to access drawing files or spreadsheet files. In this example, the synchronization engine is able to synchronize some data files with various other devices, but security of other types of files (drawing files or spreadsheet files) is improved by preventing these other types of files from being synchronized with other devices.

It should also be noted that, in one or more embodiments, in response to a read file operation, the operating system provides the requested file to the process requesting the file. If the process is permitted to access the plaintext data in the requested file, then the data is decrypted and the plaintext data is provided to the process. However, if the process is not permitted to access the plaintext data in the requested file, then the encrypted data may be provided to the process instead. This advantageously improves usability of the computing device by allowing some applications to operate on files even though they are not permitted to access the plaintext data in the files. For example, files can be stored as containers with an encrypted data file and corresponding metadata as discussed above. A synchronization process can read these containers and write them to another device without having access to the plaintext data. An application accessing the container from the other device, however, that is permitted to access the plaintext data is able to access the plaintext data.

It should also be noted that the data protection policy itself can optionally identify different policy groups that treat applications differently based on the operation. For example, a policy group may indicate that certain applications are eligible targets (entity-trusted applications) for a paste operation with less stringent blocking imposed by the operating system (e.g., the operation is allowed with user override/approval), and other applications are completely untrusted applications that the operating system prevents from receiving protected data.

Figure 3:
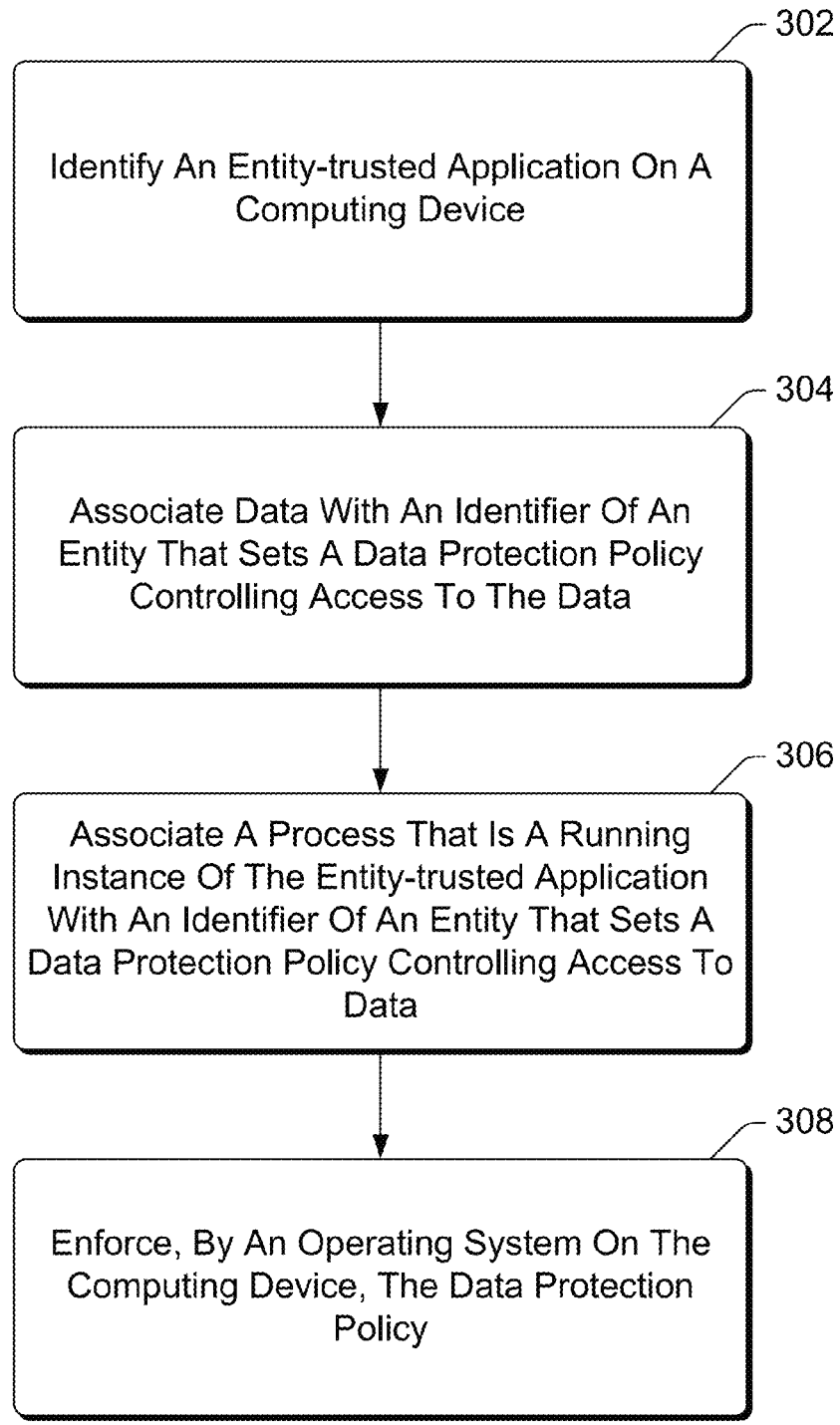
FIG. 3 is a flowchart illustrating an example process for implementing the preserving data protection with policy in accordance with one or more embodiments.

FIG. 3 is a flowchart illustrating an example process 300 for implementing the preserving data protection with policy in accordance with one or more embodiments. Process 300 is carried out by a device, such as computing device 100 of FIG. 1, and can be implemented in software, firmware, hardware, or combinations thereof. Process 300 is shown as a set of acts and is not limited to the order shown for performing the operations of the various acts. Process 300 is an example process for implementing the preserving data protection with policy; additional discussions of implementing the preserving data protection with policy are included herein with reference to different figures.

In process 300, an entity-trusted application on a computing device is identified (act 302). Whether an application is an entity-trusted application can be determined in different manners, such as using lists, other rules or criteria, and so forth as discussed above. This trust status can optionally change (between entity-trusted application and entity-untrusted application) during the lifetime of a process that is a running instance of an application as discussed above. The trust status can optionally be changed only for enlightened applications, or alternatively for enlightened applications or unenlightened applications.

Data is associated with an identifier of an entity that sets a data protection policy controlling access to the data (act 304). The data can be associated with the identifier in different manners, such as by including an ownership identifier of the entity in metadata associated with a data file that includes the data (also referred to as marking or tagging the data), or alternatively in other manners as discussed above. The entity is also referred to as the owner of the data, as discussed above.

A process that is a running instance of the entity-trusted application is associated with an identifier of an entity that sets the data protection policy controlling access to data (act 306). The process can be associated with the identifier in different manners, such as by including an ownership identifier of the entity in a process token of the process (also referred to as marking or tagging the data), or alternatively in other manners as discussed above. It should be noted that this association of a process with an ownership identifier can optionally be changed while the process is running (e.g., in response to a change in the data protection policy). The manner in which this association is changed can vary based on the manner in which the association is maintained (e.g., the ownership identifier in the process token of a running process can be changed). The identifiers of the entities in acts 304 and 306 identify the same entity, and can be the same identifiers, as discussed above.

The data protection policy of the entity is enforced by an operating system of the computing device (act 308). This enforcing of the data protection policy protects the data based on the data protection policy, as discussed above. This enforcing can include the operating system automatically encrypting data saved by the process, and further can include the operating system preventing a process that is a running instance of an entity-untrusted application from accessing the encrypted data. This enforcing can also include protecting the data when communicated over a network, protecting the data during data buffer accesses, protecting the data during clipboard accesses, protecting the data during other data sharing accesses (e.g., screen captures, data printing), and so forth as discussed above.

It should be noted that in certain situations, the operating system does not automatically encrypt data saved by a process, or does not prevent a process that is a running instance of an entity-untrusted application from accessing the encrypted data. For example, such situations can include allowing an entity-untrusted application to receive the data if the user acknowledges that this may be outside of the data protection policy and that the action will be audited. By way of another example, such situations can include allowing the actions without user intervention, but auditing the actions so breaches can be prosecuted. By way of another example, such situations can include allowing the actions without user intervention, such as when testing out how applications are actually used, and gathering data to decide which applications generally handle trusted data so that the list of applications that are trusted by the entity can be defined in such a way that the entity is comfortable turning on more stringent enforcement.

Thus, it can be seen that the techniques discussed herein advantageously allow different data to be protected using the data protection policy desired by the owner of the data without needing to display or expose a visual or logical session boundary to provide isolation assurances. The data is protected using the data protection policy and in the absence of any visible isolation of applications or user login accounts (entity-trusted applications do not have to run in a special segregation away from other applications in order to be trusted, and thus trusted applications do not appear isolated from the user point of view). The user need not log into different accounts, applications need not be run in separate application execution containers (e.g., sandboxed), and so forth. The data protection policy is applied to the applications as they are run, and the operating system advantageously provides the data protection without need for such different accounts or application containers.

However, the techniques discussed herein can be run in conjunction with, and do not preclude, any such visual or logical session boundary, different accounts or application containers, and so forth. For example, using the techniques discussed herein applications need not be run in separate application execution containers, but if the computing device does run applications in separate application execution containers the techniques discussed herein can be applied to each such application (regardless of which application execution container the application is run in). By way of another example, using the techniques discussed herein the user need not log into separate accounts, but if the user does have separate accounts on a computing device the techniques discussed herein can be applied to applications running in each account (regardless of which account the user is logged into).

Furthermore, the techniques discussed herein advantageously allow applications to protect some data while not protecting other data. Data that is important to the owner of the data is advantageously protected (including being encrypted), while at the same time the computational resources and power need not be expended to protect data that is less important to the owner of the data. Additionally, data that is protected has such protection travel with the data when transferred to another device, or the protected data is prevented from travelling to other devices.

In the discussions herein, various different embodiments are described. It is to be appreciated and understood that each embodiment described herein can be used on its own or in connection with one or more other embodiments described herein.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
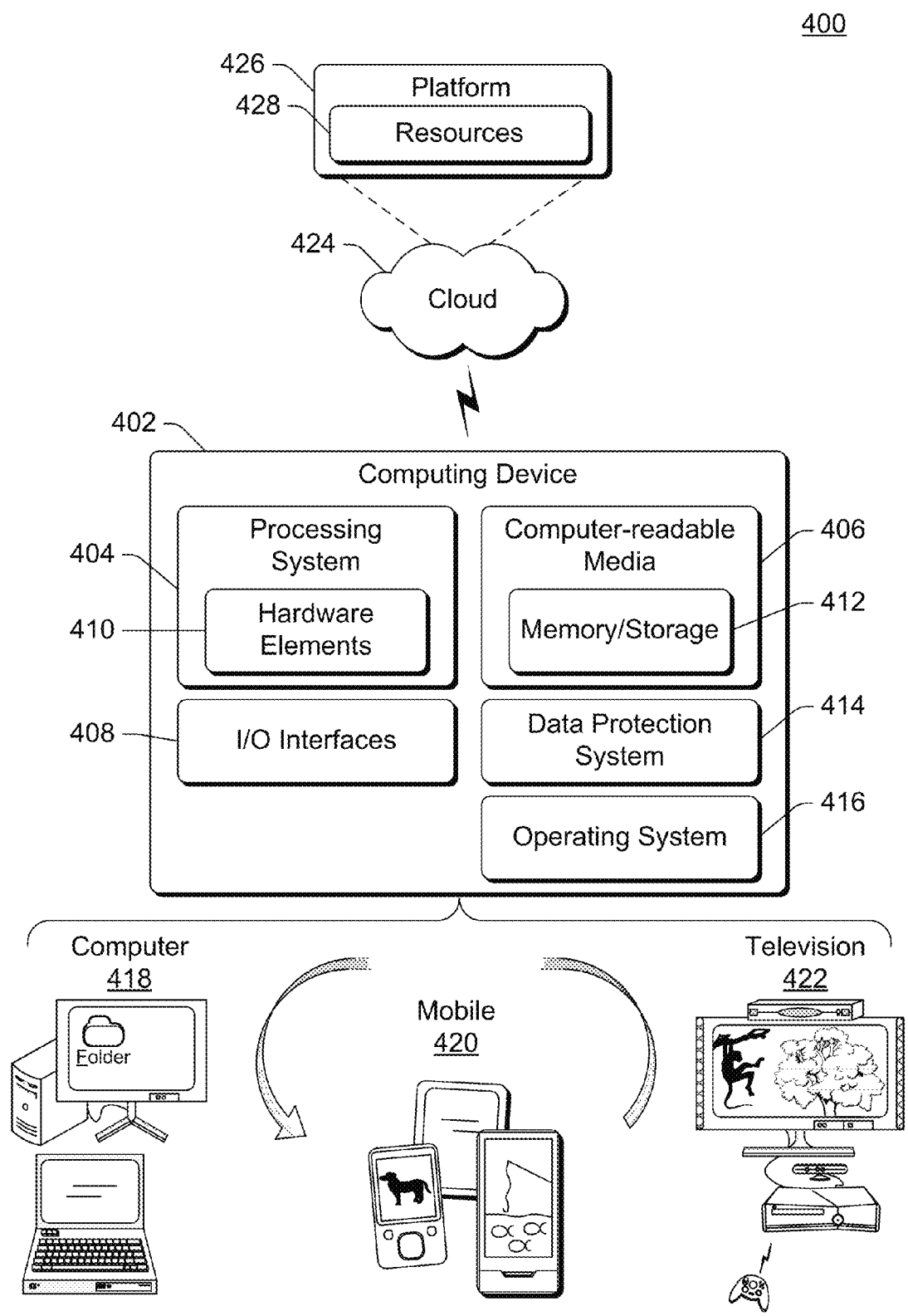
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

Input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

Computing device 402 also includes a data protection system 414 and an operating system 416, which implement the preserving data protection policy techniques discussed herein. Data protection system 414 can be, for example, the data protection system 102 of FIG. 1, and the operating system 416 can be, for example, the operating system 104 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 418, mobile 420, and television 422 uses. Each of these configurations includes devices that may have generally different constructs and capabilities, and thus the computing device 402 may be configured according to one or more of the different device classes. For instance, the computing device 402 may be implemented as the computer 418 class of a device that includes a personal computer, desktop computer, a multi-screen computer, laptop computer, netbook, and so on.

The computing device 402 may also be implemented as the mobile 420 class of device that includes mobile devices, such as a mobile phone, portable music player, portable gaming device, a tablet computer, a multi-screen computer, and so on. The computing device 402 may also be implemented as the television 422 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 424 via a platform 426 as described below.

The cloud 424 includes and/or is representative of a platform 426 for resources 428. The platform 426 abstracts underlying functionality of hardware (e.g., servers) and software resources of the cloud 424. The resources 428 may include applications and/or data that can be utilized while computer processing is executed on servers that are remote from the computing device 402. Resources 428 can also include services provided over the Internet and/or through a subscriber network, such as a cellular or Wi-Fi network.

The platform 426 may abstract resources and functions to connect the computing device 402 with other computing devices. The platform 426 may also serve to abstract scaling of resources to provide a corresponding level of scale to encountered demand for the resources 428 that are implemented via the platform 426. Accordingly, in an interconnected device embodiment, implementation of functionality described herein may be distributed throughout the system 400. For example, the functionality may be implemented in part on the computing device 402 as well as via the platform 426 that abstracts the functionality of the cloud 424.

Further aspects of the techniques discussed herein relate to one or more of the following embodiments.

A method implemented in a computing device comprises: identifying an entity-trusted application on the computing device, the entity-trusted application configured to access data; associating a first process that is a running instance of the entity-trusted application with an identifier of an entity that sets a data protection policy controlling access to the data; and enforcing, by an operating system of the computing device, the data protection policy of the entity, the enforcing including: automatically encrypting, by the operating system in accordance with the data protection policy, data saved by the first process; and preventing, by the operating system in accordance with the data protection policy, a second process that is a running instance of an entity-untrusted application from accessing the encrypted data.

Alternatively or in addition to the above described method, any one or combination of: the enforcing further including decrypting, by the operating system, data read by the first process, and providing the decrypted data to the first process; the entity-trusted application being an enlightened application, and enforcing the data protection policy includes enforcing the data protection policy in response to a request from the first process for the operating system to treat the enlightened application as an unenlightened application; the first process including multiple threads, and the enforcing the data protection policy includes enforcing the data protection policy for a first set of one or more of the multiple threads but not for a second set of one or more of the multiple threads; further comprising treating the entity-trusted application as being an untrusted application for at least part of the data protection policy in response to a request from the first process for the operating system to treat the entity-trusted application as an entity-untrusted application; the first process having multiple threads, and the first process requesting that the operating system treat a first set of one or more of the multiple threads, but not a second set of one or more of the multiple threads, as untrusted to obtain different policy enforcement behavior for the first set of one or more threads than for the second set of one or more threads; the enforcing further including protecting the data when communicating the data to another device via a network; the enforcing further including protecting the data during buffer read operations and buffer write operations; the enforcing further including protecting the data during clipboard read operations and clipboard write operations; the enforcing further including saving the encrypted data in a container file that includes both metadata and the encrypted data, the metadata including the identifier of the entity; the enforcing further including allowing the entity-untrusted application to operate on the container file but not decrypting the encrypted data for the entity-untrusted application; the automatically encrypting comprising encrypting first data written by the entity-trusted application but not encrypting second data written by the entity-trusted application; and further comprising performing the enforcing in the absence of logical or visual isolation of: the entity-trusted application and the entity-untrusted application in separate application containers, and a user of the computing device logging into different user accounts.

A computing device comprises: a processing system comprising one or more processors; and one or more computer-readable storage media having stored thereon multiple instructions that, when executed by the processing system, cause the processing system to perform acts comprising: identifying a first application on the computing device, the first application configured to access data that is encrypted; associating a data file that includes the data with an identifier of an owner of the data, the owner of the data setting data protection policy controlling access to the data, the identifier of the owner of the data being separate from an identifier of a user that is logged into the computing device; associating a first process that is a running instance of the first application with the identifier of the owner of the data; and enforcing, by an operating system of the computing device, the data protection policy of the owner, the enforcing including: allowing the data to be decrypted into plaintext data that is provided to the first process; and preventing the data from being decrypted into plaintext data and provided to a second process that is a running instance of a second application, the second process not being associated with the identifier of the owner of the data.

Alternatively or in addition to the above described computing device, any one or combination of: the enforcing further including: encrypting, by the operating system and based on a key of the owner, data written by the first process; and preventing data written by the second process from being encrypted based on the key of the owner; the encrypting further including encrypting, by the operating system, at least a first type of data written by the first process, but not encrypting at least a second type of data written by the first process; the first application being an enlightened application, and enforcing the data protection policy further including enforcing the data protection policy in response to a request from the first process for the operating system to treat the first application as an unenlightened application; the enforcing further including allowing additional data stored in a data buffer of the computing device to be decrypted into plaintext data that is provided to the first process, but preventing the additional data from being decrypted into plaintext data and provided to the second process; and the enforcing further including protecting, by the operating system and based on a key of the owner, data copied to a clipboard of the computing device by the first process, but preventing data copied to the clipboard by the second process from being associated with the owner.

A method implemented in a computing device comprises: identifying an application on the computing device; associating a data file that includes first data with an identifier of an owner of the first data by including the identifier of the owner of the first data in metadata of the data file, the owner of the first data setting data protection policy controlling access to the first data, the identifier of the owner of the first data being separate from an identifier of a user that is logged into the computing device; associating a first process that is a running instance of the application with an identifier of the owner of second data by including the identifier of the owner of the second data in a process token of the process; and enforcing, by an operating system of the computing device, the data protection policy of the owner of the first data, the enforcing including: automatically decrypting, by the operating system, the first data in the data file to generate plaintext; and providing the plaintext to the application in response to the application being an entity-trusted application, the data protection policy being satisfied, and the identifier of the owner of the first data included in the metadata of the data file identifying a same owner as the owner of the second process included in the process token.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    identifying an entity-trusted application on the computing device, the entity-trusted application configured to access data that is associated with an identifier of an entity that sets a data protection policy controlling access to the data;
    associating a first process that is a running instance of the entity-trusted application with the identifier of the entity associated with the data; and
    enforcing, by an operating system of the computing device, the data protection policy of the entity, the enforcing including:
        automatically encrypting, by the operating system in accordance with the data protection policy, data saved by the first process;
        associating the data saved by the first process with the identifier of the entity; and
        preventing, by the operating system in accordance with the data protection policy, a second process that is a running instance of an entity-untrusted application from accessing the encrypted data associated with the identifier of the entity.

2. The method as recited in claim 1, the enforcing further including: decrypting, by the operating system, data read by the first process; and providing the decrypted data to the first process.

3. The method as recited in claim 1, the entity-trusted application being an enlightened application, and enforcing the data protection policy includes enforcing the data protection policy in response to a request from the first process for the operating system to treat the enlightened application as an unenlightened application.

4. The method as recited in claim 3, the first process including multiple threads, and the enforcing the data protection policy includes enforcing the data protection policy for a first set of one or more of the multiple threads but not for a second set of one or more of the multiple threads.

5. The method as recited in claim 1, further comprising treating the entity-trusted application as being an untrusted application for at least part of the data protection policy in response to a request from the first process for the operating system to treat the entity-trusted application as an entity-untrusted application.

6. The method as recited in claim 1, the first process having multiple threads, and the first process requesting that the operating system treat a first set of one or more of the multiple threads, but not a second set of one or more of the multiple threads, as untrusted to obtain different policy enforcement behavior for the first set of one or more threads than for the second set of one or more threads.

7. The method as recited in claim 1, the enforcing further including protecting the data when communicating the data to another device via a network.

8. The method as recited in claim 1, the enforcing further including protecting the data during buffer read operations and buffer write operations.

9. The method as recited in claim 1, the enforcing further including protecting the data during clipboard read operations and clipboard write operations.

10. The method as recited in claim 1, the enforcing further including saving the encrypted data in a container file that includes both metadata and the encrypted data, the metadata including the identifier of the entity.

11. The method as recited in claim 10, the enforcing further including allowing the entity-untrusted application to operate on the container file but not decrypting the encrypted data for the entity-untrusted application.

12. The method as recited in claim 1, the automatically encrypting comprising encrypting first data written by the entity-trusted application but not encrypting second data written by the entity-trusted application.

13. The method as recited in claim 1, further comprising performing the enforcing in the absence of logical or visual isolation of: the entity-trusted application and the entity-untrusted application in separate application containers; and a user of the computing device logging into different user accounts.

14. A computing device comprising:
    a processing system comprising one or more processors; and
    one or more computer-readable storage media having stored thereon multiple instructions that, when executed by the processing system, cause the processing system to perform acts comprising:
        identifying an entity-trusted application on the computing device, the entity-trusted application configured to access data that is associated with an identifier of an entity that sets a data protection policy controlling access to the data;
        associating a first process that is a running instance of the entity-trusted application with the identifier of the entity; and
        enforcing, by an operating system of the computing device, the data protection policy of the entity, the enforcing including:
            automatically encrypting, by the operating system in accordance with the data protection policy, data saved by the first process;
            associating the data saved by the first process with the identifier of the entity; and
            preventing, by the operating system in accordance with the data protection policy, a second process that is a running instance of an entity-untrusted application from accessing the encrypted data associated with the identifier of the entity.

15. The computing device as recited in claim 14, the enforcing further including: decrypting, by the operating system, data read by the first process; and providing the decrypted data to the first process.

16. The computing device as recited in claim 14, the entity-trusted application being an enlightened application, and enforcing the data protection policy includes enforcing the data protection policy in response to a request from the first process for the operating system to treat the enlightened application as an unenlightened application.

17. The computing device as recited in claim 14, the acts further comprising treating the entity-trusted application as being an untrusted application for at least part of the data protection policy in response to a request from the first process for the operating system to treat the entity-trusted application as an entity-untrusted application.

18. The computing device as recited in claim 14, the enforcing further including protecting the data when communicating the data to another device via a network.

19. The computing device as recited in claim 14, the enforcing further including saving the encrypted data in a container file that includes both metadata and the encrypted data, the metadata including the identifier of the entity.

20. A method implemented on a computing device, the method comprising:
   identifying an entity-trusted application on the computing device, the entity-trusted application configured to access data that is associated with an entity that sets a data protection policy controlling access to the data;
   associating a first process that is a running instance of the entity-trusted application with an identifier of the entity;
   enforcing, by an operating system of the computing device, the data protection policy of the entity, the enforcing including:
      automatically encrypting, by the operating system in accordance with the data protection policy, data saved by the first process; and
      preventing, by the operating system in accordance with the data protection policy, a second process that is a running instance of an entity-untrusted application from accessing the encrypted data; and
   treating the entity-trusted application as being an untrusted application for at least part of the data protection policy in response to a request from the first process for the operating system to treat the entity-trusted application as an entity-untrusted application.

* * * * *